June 20, 1950  A. R. TWEDEN  2,512,240
STEERING POST EXTENSION FOR TRACTORS
Filed Feb. 7, 1947
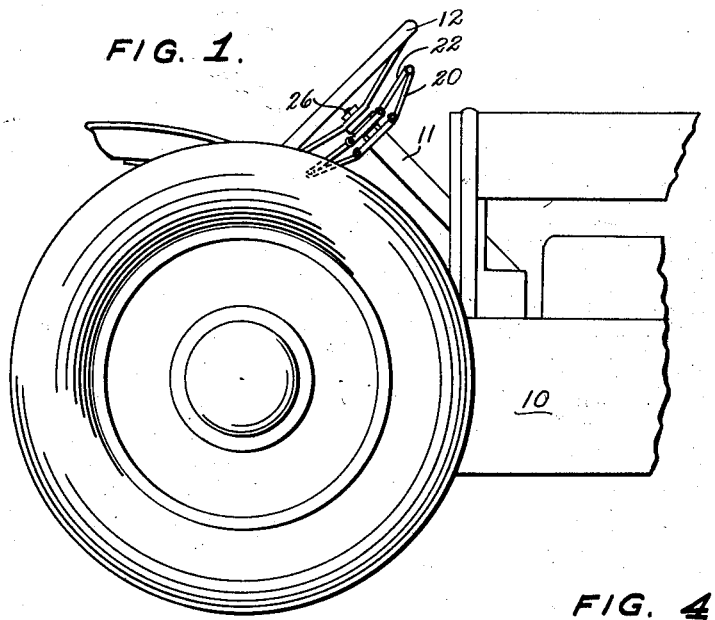
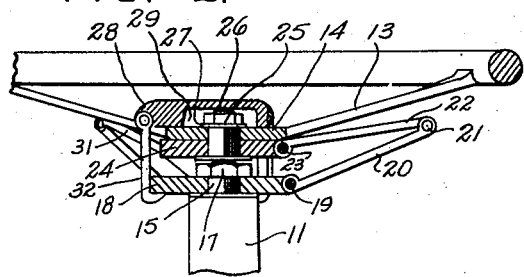
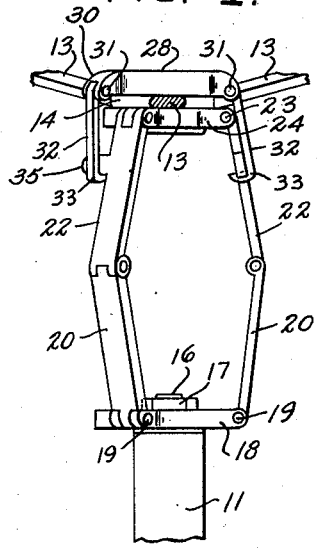
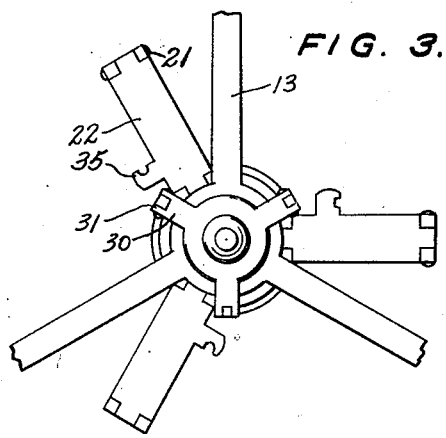
Inventor
ARNOLD R. TWEDEN,
By McMorrow, Berman & Davidson
Attorneys Patented June 20, 1950

2,512,240

UNITED STATES PATENT OFFICE 2,512,240

STEERING POST EXTENSION FOR TRACTORS

Arnold R. Tweden, Englewood, Colo.

Application February 7, 1947, Serial No. 727,211

5 Claims. (Cl. 74—493)

This invention relates to a steering post extension for motor vehicles. The invention is shown applied to a "Ford" tractor, but it could as well be applied to tractors of other makes, as well as to passenger vehicles, if desired.

In the operation of tractors, there are times when it is necessary for the operator to stand up. For instance, the operator may have to view the ground at close range in front of the tractor. It is very difficult for the operator to retain his hold on the steering wheel when driving the tractor from such standing position.

It is an object of the present invention to provide a steering post extension for tractors.

It is another object of the present invention to provide a steering post extension which is readily attachable to or detachable from a tractor.

It is a further object of the present invention to provide a steering post extension which can be attached to a tractor without the necessity of any machining operation on the steering column or post of the latter.

It is an additional object of the present invention to provide a steering post extension which is readily expansible to extended position, but which may be collapsed so as to permit the steering wheel to approximately occupy its original position.

It is a corollary object of the present invention to provide a locking device for locking the steering wheel on the extension in the expanded position and for also locking the extension in the collapsed position with the steering wheel in approximately its original position.

Still other objects, advantages and improvements will become apparent from the following specification, taken in connection with the accompanying drawings, in which:

Figure 1 is a view of the steering post extension of the present invention applied to a tractor, the extension being shown in collapsed position;

Figure 2 is a view in section of the steering post extension and the locking device therefor, the extension being shown in collapsed position;

Figure 3 is a top plan view of the steering post extension and locking device, as shown in Figure 2, except that the rim of the steering wheel is broken away in this view; and Figure 4 is a view of the steering post extension in expanded position, with the wheel secured to the extension by the locking device.

Referring now to the drawings in detail, and to Figure 1 in particular, this figure shows a "Ford" tractor, generally designated at 10, having a steering column 11 with a steering wheel 12 thereon. The steering wheel 12 has spokes 13 connecting the rim to the hub section 14. A steering shaft 15 extends concentrically through the steering column 11, this shaft having at its top a reduced threaded section 16 to which the hub section 14 of the steering wheel is normally attached by a nut. In the present invention, however, the base plate 18 of the steering shaft extension is attached to the reduced section 16 of the steering shaft 15 by a nut 17. Formed at arcuate intervals on the base plate 18 there are pairs of integral ears to which are pivotally secured at 19 the lower arms 20 of toggle levers comprising the expansible members of the steering post extension. Three of these are shown spaced 120° apart about the base plate 18, although it should be obvious that more or less could be used. Upper lever arms 22 are pivotally attached at 21 to the tops of the lower arms 20 and at their opposite ends are pivotally secured at 23 to a top plate 24. The upper toggle arms 22 each has at one side a projecting lug 35 for a purpose to be later described. The top plate 24 has a central hole therein through which a short, thick stud bolt 25 extends, the hub section 14 of the steering wheel being mounted on this stud bolt by a nut 26 and a washer 27 being positioned under the nut 26.

The locking device is comprised of a thick, generally circular plate 28 having radially projecting lugs 30 extending from its periphery. Three of the latter, arcuately spaced 120° apart, are shown, but it is obvious that a greater or less number could be used, if desired. The circular plate 28 has a large recess 29 in its bottom face for receiving the threaded end of the stud bolt 25 and nut 26 and washer 27 therein, thereby enabling the plate to fit flat on the central hub section 14 of the steering wheel. Pivotally secured at 31 to the outer ends of the radial lugs 30 on the central plate 28 are locking arms 32, each having a jaw 33 at its lower end.

The operation of the steering shaft extension of the present invention should be obvious from the preceding description of the structure. It may, however, be summarized as follows:

In Figure 2, the locking arms 32 are shown with a jaw 33 secured under the bottom plate 18 of the steering post extension and the toggle arms 20—22 collapsed. In this position the steering wheel 12 is approximately in the same plane as it would be if the steering post extension of the present invention were not present. Now, if the operator should desire to drive the tractor from a standing position, he will simply unlatch the locking arms 32, extend the steering wheel 12, thereby drawing the upper and lower toggle arms 20 and 22, respectively, to approximately aligned position, and hook the locking arms 32 under the lugs 35 on the upper toggle arms 22. The degree to which the steering wheel 12 will be moved beyond the ends of the steering column 11 and the steering shaft 15 is limited by the aligned position of the pairs of toggle arms 20—22, and, within this limit, the operator may hold the steering wheel at any desired position which will be determined by the position of his hands when he is driving in a standing position above that when he is in a sitting position.

While I have shown the preferred embodiment of my invention, it is to be understood that various changes in the size, shape and arrangement of parts may be resorted to without departing from the spirit of the invention and the scope of the appended claims.

Having described the invention, what I claim as new and useful, and desire to secure by Letters Patent of the United States, is:

1. In a steering post extension for motor vehicles adapted to be secured to the steering shaft, a rigid member adapted to be secured to the steering shaft, a second rigid member adapted to be secured to the steering wheel, toggle lever means pivotally connected between said rigid members, and means for locking said toggle lever means in collapsed position comprising a member adapted to fit over the steering wheel and having hooked arms thereon adapted to engage said first-mentioned rigid member.

2. A steering post extension for a motor vehicle comprising a bottom plate secured to the upper end of the vehicle steering shaft, a top plate secured to the vehicle steering wheel, and a plurality of angularly-spaced toggle arm assemblies pivotally secured at their opposite ends to said top and bottom plates to provide freedom of relative movement of said plates toward and away from each other while maintaining a torsional connection between the vehicle steering wheel and steering shaft.

3. A steering post extension for a motor vehicle comprising a bottom plate secured to the upper end of the vehicle steering shaft, a top plate secured to the vehicle steering wheel, and a plurality of angularly spaced toggle arm assemblies each pivotally secured at one end to said bottom plate, at its opposite end to said top plate and including two flat arms pivotally secured together at their adjoining ends, said toggle arm assemblies providing freedom of movement of said wheel toward and away from said shaft while restraining said wheel and shaft against relative rotation.

4. A steering post extension for a motor vehicle comprising a bottom plate secured to the upper end of the vehicle steering shaft, a top plate secured to the vehicle steering wheel, a plurality of angularly-spaced toggle arm assemblies each pivotally secured at one end to said bottom plate, at its opposite end to said top plate and including two flat arms pivotally secured together at their adjoining ends, said toggle arm assemblies providing freedom of movement of said wheel toward and away from said shaft while restraining said wheel and shaft against relative rotation, and locking means carried by said steering wheel and engageable with said bottom plate to lock the wheel in non-extended position relative to the steering shaft, and engageable with the toggle arms connected to said upper plate to lock the steering wheel in extended position relative to the steering shaft.

5. A steering post extension for a motor vehicle comprising a bottom plate secured to the upper end of the vehicle steering shaft, a top plate secured to the vehicle steering wheel, a plurality of angularly-spaced toggle arm assemblies each pivotally secured at one end to said bottom plate, at its opposite end to said top plate and including two flat arms pivotally secured together at their adjoining ends, said toggle arm assemblies providing freedom of movement of said wheel toward and away from said shaft while restraining said wheel and shaft against relative rotation, and locking means carried by said steering wheel and engageable with said bottom plate to lock the wheel in non-extended position relative to the steering shaft, and engageable with the toggle arms connected to said upper plate to lock the steering wheel in extended position relative to the steering shaft, said locking means including a plate overlying said steering wheel at the center of the latter and provided with pairs of angularly-spaced, apertured lugs, locking means each pivotally connected at one end to one pair of said lugs and having a locking hook at its opposite end engageable with said bottom plate to lock the steering wheel in non-extended position relative to the steering shaft, and a lug on each of the toggle arms connected to said upper plate engageable by said locking arm hooks to lock said toggle arm assemblies with the steering wheel in extended position relative to the steering shaft.

ARNOLD R. TWEDEN.

REFERENCES CITED

The following references are of record in the file of this patent:

UNITED STATES PATENTS

| Number | Name | Date |
| --- | --- | --- |
| 871,109 | Coates | Nov. 19, 1907 |
| 2,114,663 | Erickson | Apr. 19, 1938 |

FOREIGN PATENTS

| Number | Country | Date |
| --- | --- | --- |
| 527,927 | Great Britain | Oct. 18, 1940 |